United States Patent
Ogasahara et al.

(10) Patent No.: US 12,354,140 B2
(45) Date of Patent: Jul. 8, 2025

(54) ENERGY OPERATION SUPPORT DEVICE, ENERGY OPERATION SUPPORT METHOD, AND METHOD FOR RUNNING STEEL WORKS

(71) Applicant: JFE STEEL CORPORATION, Tokyo (JP)

(72) Inventors: Tomoyoshi Ogasahara, Tokyo (JP); Masahiro Uno, Tokyo (JP); Takayasu Aoyama, Tokyo (JP); Yuki Tashima, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 0 days.

(21) Appl. No.: 18/267,040

(22) PCT Filed: Dec. 22, 2020

(86) PCT No.: PCT/JP2020/047796
§ 371 (c)(1),
(2) Date: Jun. 13, 2023

(87) PCT Pub. No.: WO2022/137311
PCT Pub. Date: Jun. 30, 2022

(65) Prior Publication Data
US 2024/0311882 A1 Sep. 19, 2024

(51) Int. Cl.
*G06Q 30/0283* (2023.01)
*G06Q 50/06* (2024.01)
(52) U.S. Cl.
CPC ......... *G06Q 30/0283* (2013.01); *G06Q 50/06* (2013.01)
(58) Field of Classification Search
None
See application file for complete search history.

(56) References Cited

U.S. PATENT DOCUMENTS

2008/0262857 A1 10/2008 Perera
2013/0346345 A1* 12/2013 Osogami ............ G06Q 30/0283
705/412
(Continued)

FOREIGN PATENT DOCUMENTS

CN 104392334 A * 3/2015
JP 2006-048475 A 2/2006
(Continued)

OTHER PUBLICATIONS

Hadera, Hubert, et al. "Optimization of steel production scheduling with complex time-sensitive electricity cost." Computers & Chemical Engineering 76 (2015): 117-136 (Year: 2015).*

(Continued)

*Primary Examiner* — George Chen
(74) *Attorney, Agent, or Firm* — Aaron L. Webb (57) ABSTRACT

An energy operation support device includes: an optimization calculation unit; and operation guideline transmission units. The calculation unit sets an operation condition of an energy facility as a determination variable based on information obtained from a result value/prediction value acquisition unit, unit price information acquisition unit, and functioning information acquisition unit, constitutes a balance condition of an energy utility, and adds a shortage amount determination variable of the energy utility to the generation variable side of the balance condition and establishes a constraint condition. Then, the unit sets an objective function containing the total cost for the energy operation of a steel works and the shortage amount determination variable and arithmetically operates the determination variable so the objective function asymptotically approaches the optimum value to satisfy the constraint condition. The transmission units transmit an operation guideline to an (Continued)

operator based on the shortage amount arithmetically operated in the calculation unit.

2 Claims, 5 Drawing Sheets (56) References Cited

U.S. PATENT DOCUMENTS

2019/0156438 A1  5/2019  Song et al.
2020/0327626 A1  10/2020  Leung et al.

FOREIGN PATENT DOCUMENTS

| JP | 2009-070200 A | 4/2009 |
| JP | 2016-093016 A | 5/2016 |
| RU | 2 376 693 C2 | 12/2009 |
| WO | 2015/174359 A1 | 11/2015 |

OTHER PUBLICATIONS

Dec. 1, 2023 Office Action issued in Russian Patent Application No. 2023115144.
Mar. 28, 2024 Office Action issued in Russian Patent Application No. 2023115144.
Mar. 23, 2021 International Search Report issued in International Patent Application No. PCT/JP2020/047796.
Jun. 13, 2023 International Preliminary Report on Patentability issued in International Patent Application No. PCT/JP2020/047796.

* cited by examiner

A FACTORY  SJ···GENERATION AMOUNT RESULT VALUE    DJ···CONSUMPTION AMOUNT RESULT VALUE
          SY···GENERATION AMOUNT PREDICTION VALUE  DY···CONSUMPTION AMOUNT PREDICTION VALUE

| YEAR, MONTH, DAY, HOUR, MINUIT | B GAS | | | | C GAS | | | | LD GAS | | | | M GAS | | | | STEAM | | | | POWER | | | |
|---|---|---|---|---|---|---|---|---|---|---|---|---|---|---|---|---|---|---|---|---|---|---|---|---|
| | SJ | DJ | SY | DY | SJ | DJ | SY | DY | SJ | DJ | SY | DY | SJ | DJ | SY | DY | SJ | DJ | SY | DY | SJ | DJ | SY | DY |
| YMDHM (CURRENT TIME) | ○ | □ | | | ○ | □ | | | ○ | □ | | | ○ | □ | | | ○ | □ | | | ○ | □ | | |
| Ymdhm | | | ◎ | △ | | | ◎ | △ | | | ◎ | △ | | | ◎ | △ | | | ◎ | △ | | | ◎ | △ |
| ⋮ | | | ⋮ | ⋮ | | | ⋮ | ⋮ | | | ⋮ | ⋮ | | | ⋮ | ⋮ | | | ⋮ | ⋮ | | | ⋮ | ⋮ |
| Ymdhm (DESIGNATED TIME) | | | ◎ | △ | | | ◎ | △ | | | ◎ | △ | | | ◎ | △ | | | ◎ | △ | | | ◎ | △ |

POWER GENERATION AMOUNT OF POWER GENERATION FACILITY

FIG. 7

BY-PRODUCT GAS AMOUNT

FIG. 8

HEAVY OIL AMOUNT

FIG. 9

|   | C GAS SHORTAGE AMOUNT [GJ/h] | OPERATION GUIDELINES |
|---|---|---|
| 1 | 0 OR MORE AND LESS THAN 300 | PURCHASE OF CITY GAS |
| 2 | 300 OR MORE AND LESS THAN 600 | PURCHASE OF CITY GAS AND USE AMOUNT REDUCTION OF HOT STOVE |
| 3 | 600 OR MORE | USE AMOUNT REDUCTION OF COKE OVEN AND HOT STOVE |

ENERGY OPERATION SUPPORT DEVICE, ENERGY OPERATION SUPPORT METHOD, AND METHOD FOR RUNNING STEEL WORKS

TECHNICAL FIELD

The present invention relates to an energy operation support device, an energy operation support method, and a method for running a steel works for providing support to optimize the cost of energy utilities in the operation of the energy utilities in the steel works.

BACKGROUND ART

A steel works has a large number of factories from upstream processes (blast furnace, coke oven, steel making process) to downstream processes (rolling, surface treatment process). In the upstream processes, a B gas (blast Furnace gas), a C gas (Coke gas), and an LD gas (LD converter gas), which are by-product gases containing heat generating components, are generated.

An operation is performed in which these gases are used directly or in the form of an M gas (Mixed gas), which is obtained by mixing these gases and adjusting the calorific value, as fuel for heating furnaces and power generation facilities of rolling mills.

Herein, a facility referred to as a gas holder, which serves as a tank for storing the gas, is used to adjust a difference between the generation amount and the use amount of the gas. For example, in a situation in which the generation amount of the by-product gas is larger than the use amount of the by-product gas, the by-product gas is stored in the gas holder, increasing the storage amount (gas holder level) of the by-product gas. Conversely, in a situation in which the use amount of the by-product gas is larger than the generation amount of the by-product gas, the use amount is satisfied by discharging the gas from the gas holder.

When the generation amount of the by-product gas is excessively large relative to the use amount and reaches the upper limit of the gas holder level, the excess gas is burned and diffused into the atmosphere. On the other hand, in the opposite case, a gas shortage occurs, and therefore the use amount is suppressed by lowering an output of a power generation facility. When the gas shortage cannot be dealt with, the factory running level is lowered.

Besides the operation of the by-product gas, the operation of power or steam is mentioned, for example. In the operation of the power, the operation is performed by increasing the output of the power generation facility to reduce the power purchase amount during a time zone when the unit price of the power is high (generally during the daytime). The power generation amount is lowered in the time zone (generally at night) when the unit price of the power is low. Such an operation policy of the power generation facility depends on the unit price. In the operation of the steam, the steam is generated in a boiler utilizing exhaust heat of converters, sintering furnaces, or the like and is used for thermal insulation of a pickling tank or an RH (vacuum degassing facility) of cold rolling mills and the like. When a shortage occurs, the shortage is compensated by bleed air from the power generation facility (operation of obtaining the steam from the middle stage of a turbine, the power generation amount decreases) and purchasing steam from the outside of the steel works.

Several technologies of operating the energy utilities in such a steel works or factories such that the cost is minimized have been published (e.g., PTLS 1 to 3).

The technology of PTL 1 re-evaluates the optimum solution obtained by an optimization method based on a re-evaluation function, to which an evaluation index considering a variation of state variables, including the plant operation amount, is added in a device for optimizing the plant operation. Thus, the influence of the variation of the state variables on the optimum solution is grasped, and the evaluation function value having the optimum solution is further stabilized. More specifically, a solution having a small variation of the evaluation function value is found.

The technology of PTL 2 proposes an optimum design method enabling the minimization of operating costs/gas emissions. PTL 2 determines the optimum capacity of each equipment when a load pattern of a plant (start/shutdown plan value of each equipment) is given.

The technology of PTL 3 proposes a method for creating a working plan even when the required reserve power of the power generation facility cannot be secured. PTL 3 generates the working plan such that, when the adjustment amount of the power generation amount that can be secured is smaller than the required adjustment amount, the value of an extended objective function is minimized, the extended objective function being obtained by adding a penalty function calculating a value corresponding to the shortage of the required adjustment amount to the original objective function.

The technology of PTL 1 determines a stable solution as the value of a cost function even in a circumstance where running conditions vary. The technology of PTL 2 determines such an optimum capacity of the equipment that the cost is minimized when the plant working plan is given. These technologies of PTLS 1, 2 perform optimization calculations under given working plans and running conditions. When one of the running conditions, a balance condition indicating the energy balance, is not satisfied by any operation amount, a state of the absence of an optimum solution is established as the optimization calculation.

The technology of PTL 3 avoids the state of the absence of the optimum solution by considering, in a case where the adjustment amount of the power generation amount is smaller than a specified value, an objective function in which the case is added as a penalty to the objective function. However, a condition of no adjustment amount of the power generation amount leads to the state of the absence of the optimum solution.

CITATION LIST

Patent Literatures

PTL 1: JP 2009-70200 A
PTL 2: JP 2006-48475 A
PTL 3: JP 2016-93016 A

SUMMARY OF INVENTION

Technical Problem

In the running of the steel works, when the factory is stopped due to unforeseen factors (trouble) or when the factory has a poor functioning plan, a balance expression expressing the energy balance cannot be established due to the shortage of the generated gas amount, power amount, and steam, and a solution is not determined by the optimization calculation. In such a case, an operator changes the working plan itself in each factory and lowers the consumption amount such that the balance expression is established. At this time, the change of the working plan needs to be performed according to the shortage amount. When a working plan to excessively stop the factory is drafted, the production amount is lowered, so that the cost of the entire steel works is increased. Therefore, the minimum necessary working plan needs to be drafted.

However, the technologies of PTLS 1 to 3 described above effectively work in a case of a trouble-free running, but an effective solution is not obtained when the running conditions are such that the optimum solution is absent.

Even when such a calculation of PTL 3 that the state of the absence of the optimum solution is avoided is performed, there is a problem that it is not possible to present an operation support measure for changing the working plan of each factory to the operator.

The present invention has been made focusing on the unsolved problems of the conventional examples described above. It is an object of the present invention to provide an energy operation support device, an energy operation support method, and a method for running a steel works, capable of presenting a minimum necessary change plan of the working plan of an energy facility to an operator of each factory in the situation of the shortage of the energy utilities (at least one of by-product gases, steam, and power) in the steel works.

Solution to Problem

To achieve the above-described object, an energy operation support device according to one aspect of the present invention includes: a result value/prediction value acquisition unit configured to acquire result values of the generation amount and the consumption amount of an energy utility at the current time and prediction values of the generation amount and the consumption amount of the energy utility from the current time to a designated time for each factory configuring a steel works; a unit price information acquisition unit configured to acquire unit price information required for calculating the total cost for an energy operation of the steel works; a functioning information acquisition unit configured to acquire functioning information of an energy facility of the steel works; an optimization calculation unit configured to, based on information obtained from the result value/prediction value acquisition unit, the unit price information acquisition unit, and the functioning information acquisition unit, set an operation condition of the energy facility as a determination variable, constitute a balance condition of the energy utility, add a shortage amount determination variable of the energy utility to a generation variable side of the balance condition and establish a constraint condition, set an objective function containing the total cost for the energy operation of the steel works and the shortage amount determination variable, and arithmetically operate the determination variable such that the objective function asymptotically approaches the optimum value to satisfy the constraint condition; and an operation guideline transmission unit configured to transmit an operation guideline to an operator based on the shortage amount arithmetically operated in the optimization calculation unit.

An energy operation support method according to one aspect of the present invention includes: a result value/prediction value acquisition step of acquiring result values of the generation amount and the consumption amount of an energy utility at the current time and prediction values of the generation amount and the consumption amount of the energy utility from the current time to a designated time for each factory configuring a steel works; a unit price information acquisition step of acquiring unit price information required for calculating the total cost for an energy operation of the steel works; a functioning information acquisition step of acquiring functioning information of an energy facility of the steel works; an optimization calculation step of, based on information obtained from the result value/prediction value acquisition unit, the unit price information acquisition unit, and the functioning information acquisition unit, setting an operation condition of the energy facility as a determination variable, constituting a balance condition of the energy utility, adding a shortage amount determination variable of the energy utility to a generation variable side of the balance condition and establish a constraint condition, setting an objective function containing the total cost for the energy operation of the steel works and the shortage amount determination variable, and arithmetically operating the determination variable such that the objective function asymptotically approaches the optimum value to satisfy the constraint condition; and an operation guideline transmission step of transmitting an operation guideline to an operator based on the shortage amount arithmetically operated in the optimization calculation unit.

A method for running a steel works according to one aspect of the present invention includes: changing the operation condition of the energy facility or changing a running condition of a manufacturing facility within the steel works based on the energy operation support method described above.

Advantageous Effects of Invention

The energy operation support device, the energy operation support method, and the method for running a steel works according to the present invention can present the minimum necessary change plan of the working plan of the energy facility to the operator of each factory in the situation of the shortage of the energy utilities in the steel works.

DESCRIPTION OF EMBODIMENTS

An embodiment of the present invention will now be described with reference to the drawings. In the following description of the drawings, the same or similar reference numerals are attached to the same or similar parts.

The embodiment described below exemplifies devices and methods for embodying the technical idea of the present invention. The technical idea of the present invention does not specify materials, shapes, structures, arrangement, and the like of constituent components to the materials, shapes, structures, arrangement, and the like described below. The technical idea of the present invention can be variously altered within the technical range defined by Claims.

An energy operation support device, which is one embodiment of the present invention, is a device providing support to optimize the cost of energy utilities in the operation of the energy utilities in a steel works.

The energy utilities include at least one of by-product gases, steam, and power generated within the steel works.

Figure 1:
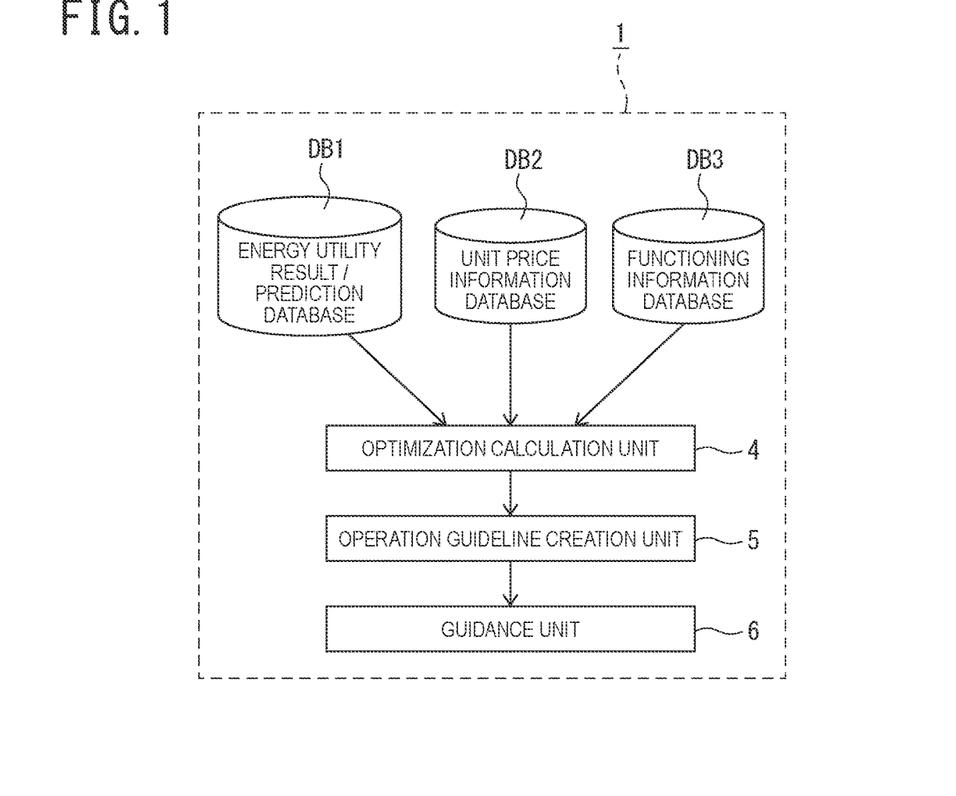
FIG. 1 is a block diagram illustrating the configuration of an energy operation support device according to the present invention.

As illustrated in FIG. 1, an energy operation support device 1 of this embodiment contains an information processing apparatus, such as a personal computer or a workstation, and includes: an energy utility result/prediction database DB1, a unit price information database DB2, a functioning information database DB3, an optimization calculation unit 4, an operation guideline creation unit 5, and a guidance unit 6. The optimization calculation unit 4 and the operation guideline creation unit 5 are realized by the execution of a computer program by an arithmetic operation processing device, such as a CPU, in the information processing apparatus.

The energy utility result/prediction database DB1 contains a non-volatile storage device, and stores result values of the generation amount and the consumption amount of the energy utilities (by-product gases, steam, power) and prediction values of the generation amount and the consumption amount of the energy utilities from the current time to a designated time of a plurality of factories configuring the steel works.

The generation amount of a B gas is predicted using the generation amount at the current time and blast furnace functioning information. When the blast furnace is functioning, the prediction value is created assuming that the generation amount at the current time continues into the future. When the blast furnace stops blasting, the prediction is performed such that the generation amount is 0.

The generation amount of a C gas is predicted using the generation amount at the current time and the coal charge amount of each coke oven kiln.

The generation amount of an LD gas is predicted using an oxygen blowing plan.

The consumption amount of an M gas in the factories is predicted using a slab charging plan in a heating furnace or the consumption amount of the M gas at the current time.

Figure 2:
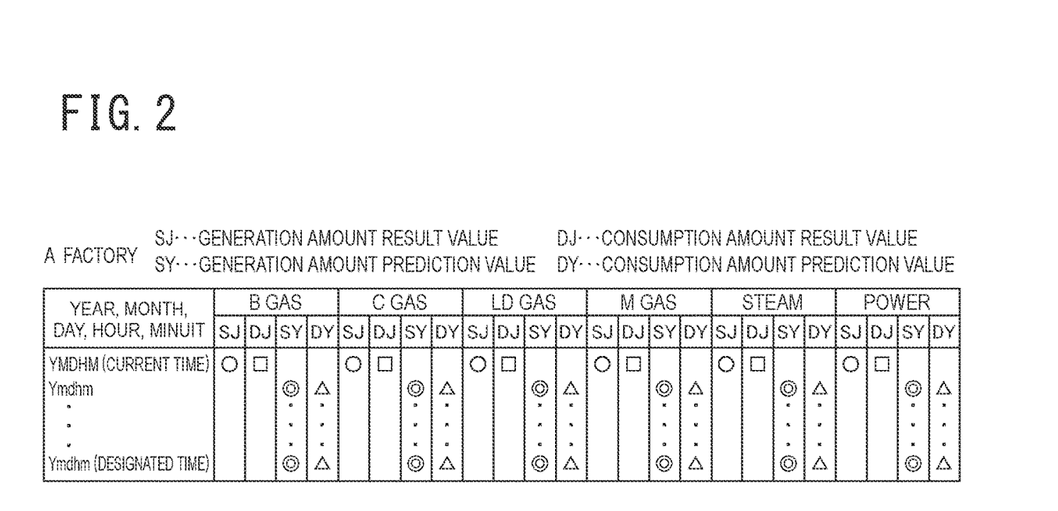
FIG. 2 illustrates data of energy utilities of a predetermined factory stored in an energy utility result/prediction database of the energy operation support device according to the present invention.

FIG. 2 illustrates data of the energy utilities of an A factory configuring the steel works stored in the energy utility result/prediction database DB1. By-product gases in the energy utility data are the B gas (blast Furnace gas), the C gas (Coke gas), the LD gas (LD converter gas), and the M gas (Mixed gas) obtained by mixing the gases and adjusting the calorific value. The power is power generated from a top pressure recovery turbine power generation facility (TRT) and a coke dry quenching system (CDQ). The steam is steam generated in accordance with the running of a converter or a sintering furnace. The energy utility data of the A factory in FIG. 2 stores a generation amount result value SJ and a consumption amount result value DJ at the current time and a generation amount prediction values SY and a consumption amount prediction values DY of the energy utilities from the current time to a designated time (for example, 180 minutes later).

The energy utility result/prediction database DB1 further stores, together with the energy utility data of the A factory illustrated in FIG. 2, the generation amount result values SJ and the consumption amount result values DJ at the current time of the energy utilities and the generation amount prediction values SY and the consumption amount prediction values DY of the energy utilities from the current time to a designated time of the other factories (B factory, C factory, . . . ).

The unit price information database DB2 stores information, such as a power unit price, a steam unit price, a heavy oil unit price, and a unit price of pure water for boiler supply.

The functioning information database DB3 stores, when there is a plan to stop energy facilities (power generation facility, TRT, CDQ, gas holder, mixed gas manufacturing facility) due to periodic inspection, trouble, or the like, functioning information, such as a stop time and a re-functioning time, of the energy facilities.

The optimization calculation unit 4 performs an optimization calculation of outputting such an operation condition of the energy facilities that the total cost for the energy operation of the steel works is minimized or set to a value close to the minimum as a determination variable. This optimization calculation unit 4 specifically arithmetically operates a shortage amount determination variable and consumption variables and also arithmetically operates a total cost F to be optimized, which are described later, by inputting of the information of the energy utility result/prediction database DB1, the information of the unit price information database DB2, and the information of the functioning information database DB3 in a numerical expression in which a constraint condition and the total cost related to the energy operation support are formulated in advance as a mixed integer programming problem, which is one of the mathematical problems. As a solution for the mixed integer programming problem, the branch-and-bound method and the like are usable, and the solution is described, for example, in the prior art document "Predictive Control of Hybrid Systems and Its Application to Process Control, Systems/Control/Information, Vol. 46, No. 3, p.p. 110-119, 2002".

The operation guideline creation unit 5 creates an operation guideline based on a shortage amount X of a predetermined energy utility arithmetically operated in the optimization calculation unit 4. Specifically, the operation guideline creation unit 5 stores, for a predetermined energy facility, a plurality of operation guideline data, such as an operation guideline of purchasing external energy, an operation guideline of purchasing external energy and reducing the use amount of the predetermined energy facility, or an operation guideline of reducing the use amount of the predetermined energy facility, in the form of a table (for example, see FIG. 9). Then, the operation guideline creation unit 5 selects the operation guideline data corresponding to the shortage amount X of the energy utility arithmetically operated in the optimization calculation unit 4.

The guidance unit 6 displays the operation guideline data corresponding to the shortage amount X selected in the operation guideline creation unit 5 on a guidance screen. Then, an operator changes the operation condition of the energy facility referring to the operation guideline data information output onto the guidance screen.

Figure 3:
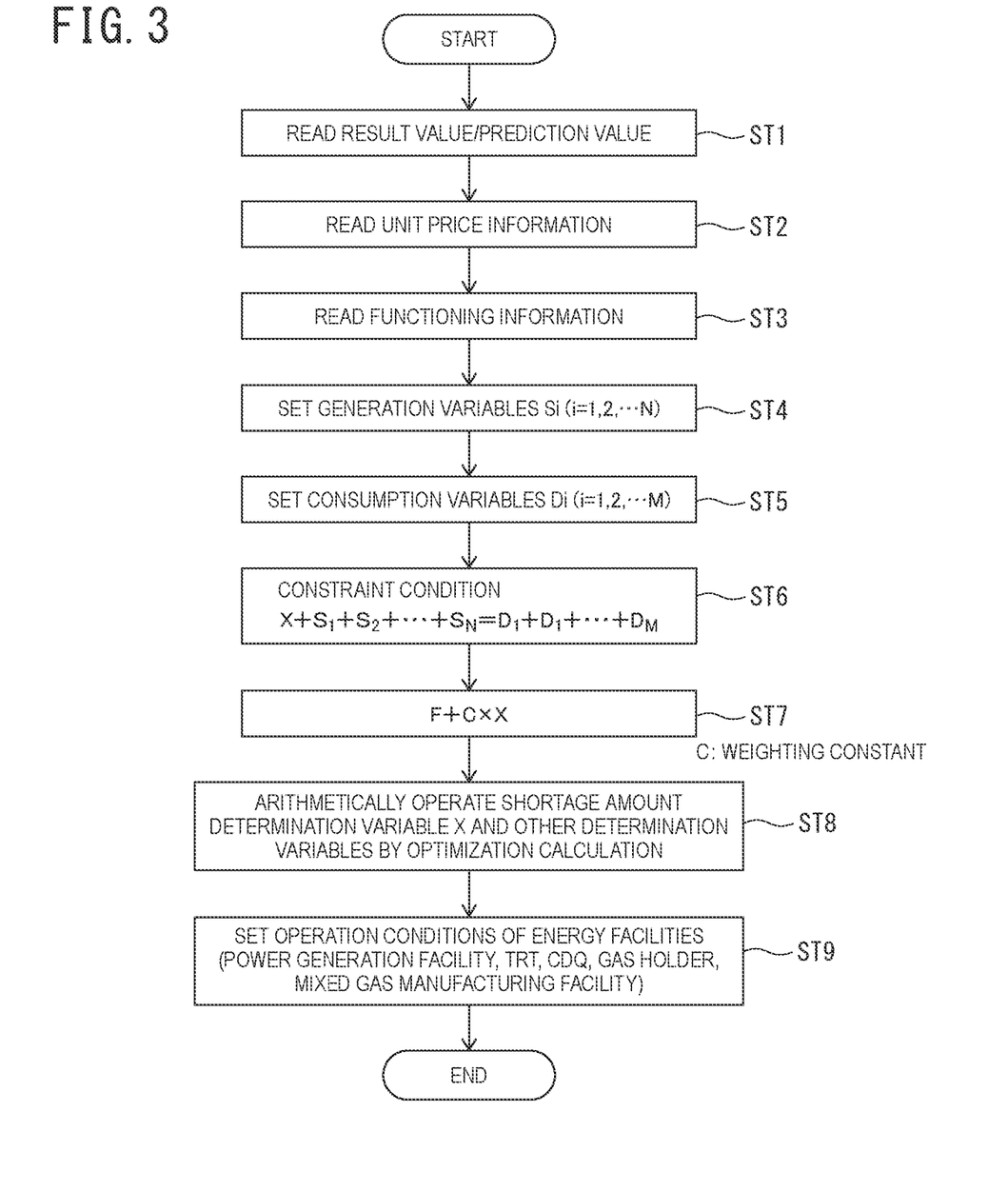
FIG. 3 is a flow chart illustrating optimization calculation processing performed by an optimization calculation unit of the energy operation support device according to the present invention.

Next, the optimization calculation processing performed by the optimization calculation unit 4 is described with reference to the flowchart of FIG. 3.

First, Step ST1 reads all of the generation amount result values SJ and the consumption amount result values DJ at the current time of the energy utilities and the generation amount prediction values SY and the consumption amount prediction values DY of the energy utilities from the current time to a designated time of the A factory, the B factory, the C factory, . . . stored in the energy utility result/prediction database DB1.

Next, Step ST2 reads the purchase unit prices of the power, the steam, pure water for supply to a private boiler, and the like stored in the unit price information database DB2.

Next, Step ST3 reads the functioning information of the energy facilities (power generation facility, TRT, CDQ, gas holder, mixed gas manufacturing facility) stored in the functioning information database DB3.

Next, Step ST4 sets generation variables Si (i=1, 2, . . . . N) based on the information read in Step ST1 to establish a constraint condition. Herein, i=1, 2, . . . N are subscripts representing the factories or the energy facilities. In the case of the factories, the generation variables Si are the result values or the prediction values and, in the case of the energy facilities, the generation variables Si are determination variables.

Next, Step ST5 sets consumption variables Di (i=1, 2, . . . M) based on the information read in Step ST1 to establish a constraint condition. Herein, i=1, 2, . . . M are subscripts representing the factories or the energy facilities. In the case of the factories, the consumption variables Di are the result values or the prediction values and, in the case of the energy facilities, the consumption variables Di are determination variables.

Next, Step ST6 adds the shortage amount determination variable X (X≥0) to the left-hand side of an expression representing the balance condition of the energy utilities where the generation variable Si on the left-hand side and the consumption variables Di on the right-hand side are equal based on the information read in Steps ST1, ST2, ST3, thereby establishing the constraint condition represented in Expression (1) below. This constraint condition is the condition required to be established at each time.

$$X + S_1 + S_2 + \ldots + S_N = D_1 + D_2 + \ldots + D_M \quad (1)$$

Next, Step ST7 sets an objective function required to be minimized or set to a value close to the minimum. This is obtained by adding a value obtained by multiplying the shortage amount determination variable X by a weighting constant C to the total cost F using the unit price information and the use amount.

$$\text{(Objective function)} = F + CX$$

Then, Step ST8 arithmetically operates the total cost F and the shortage amount determination variable X such that the objective function is minimized or set to a value close to the minimum under the constraint condition in Expression (1).

Herein, assuming that the shortage amount determination variable X is a very small value, the weighting constant C is set such that the CX at this time is sufficiently larger than the total cost F. Then, the shortage amount determination variable X is substantially 0 in the optimization calculation in a situation in which the gas shortage does not occur. On the other hand, in a situation in which the gas shortage occurs, the shortage amount determination variable X can be set to a shortage amount having a value larger than 0.

Next, Step ST9 sets the operation conditions of the holder, mixed gas manufacturing facility) arithmetically operated in Step ST8, and then ends the optimization calculation process.

Herein, the result value/prediction value acquisition unit and the result value/prediction value acquisition step described in the present invention correspond to the energy utility result/prediction database DB1, and the unit price information acquisition unit and the unit price information acquisition step described in the present invention correspond to the unit price information database DB2. The functioning information acquisition unit and the functioning information acquisition step described in the present invention correspond to the functioning information database DB3, and the operation guideline transmission unit and the operation guideline transmission step described in the present invention correspond to the operation guideline creation unit 5 and the guidance unit 6.

Next, a circumstance when trouble has occurred in the running of the steel works is described with reference to FIGS. 4 to 8.

Figure 4:
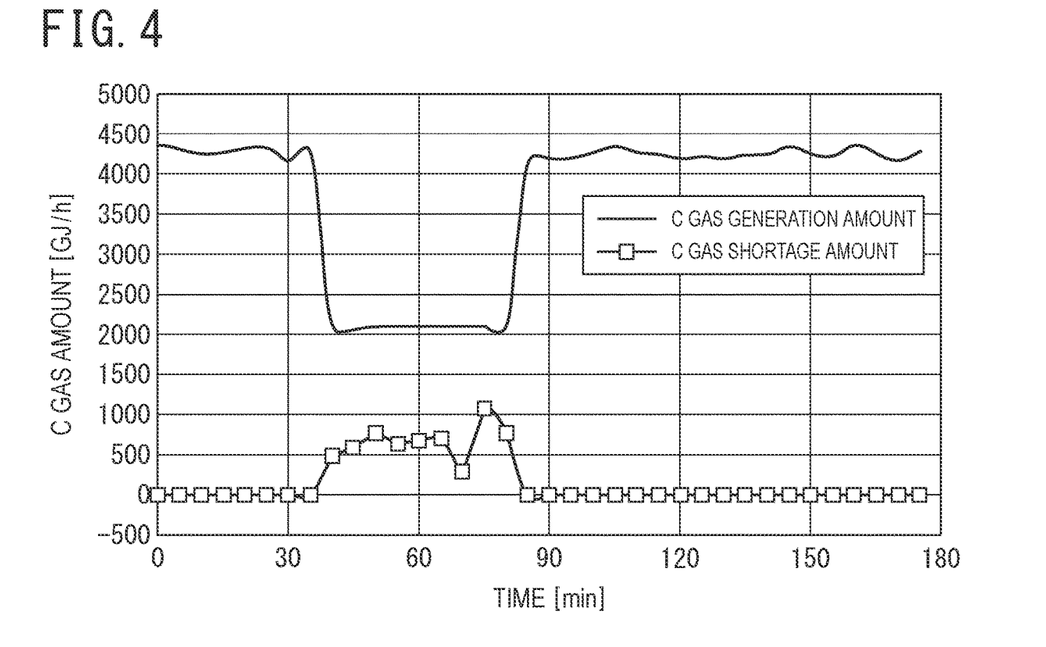
FIG. 4 is a graph illustrating changes with time of the generation amount of a C gas and the shortage amount of the C gas when trouble has occurred in a coke oven of a steel works.

FIG. 4 illustrates a circumstance in which trouble has occurred in the coke oven in the steel works and the generation amount of the C gas is systematically reduced, in which the generation amount of the C gas decreases and the shortage amount increases for 30 to 50 minutes.

Figure 5:
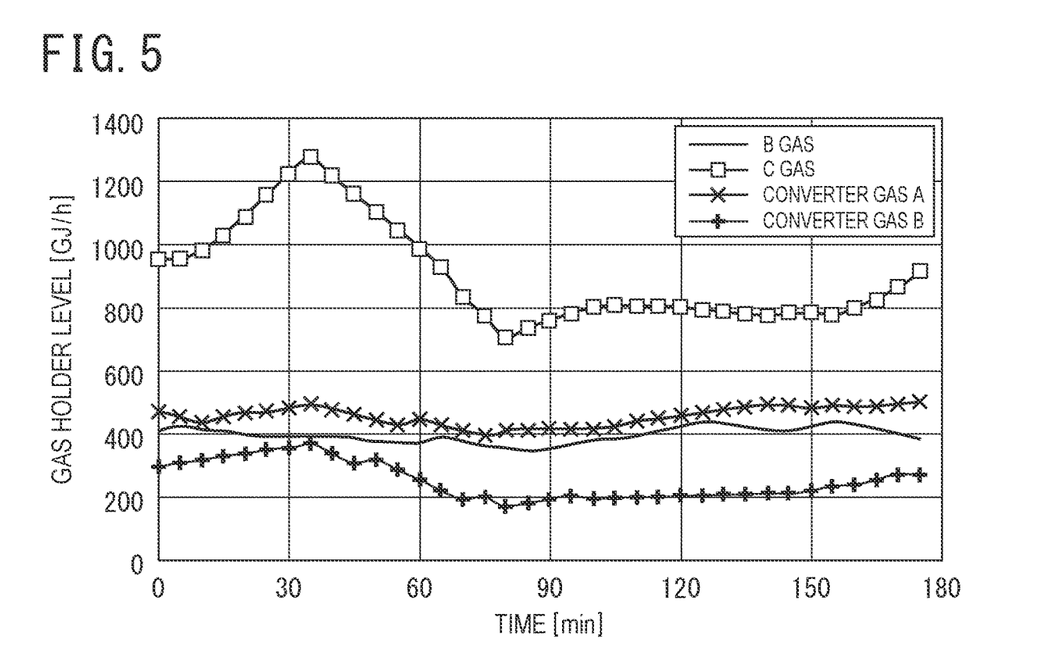
FIG. 5 is a graph illustrating level changes with time in gas holders storing a B gas, the C gas, a converter gas A, and a converter gas B in the steel works.

FIG. 5 is a graph illustrating level changes with time of the gas holders storing the B gas, the C gas, the converter gas A, and the converter gas B when trouble has occurred in the coke oven. The operator predicts the decrease in the generation amount of the C gas, thereby keeping the gas level in the gas holder of the C gas high in advance and gradually uses the C gas in the gas holder of the C gas from 30 minutes after the start of the operation.

Figure 6:
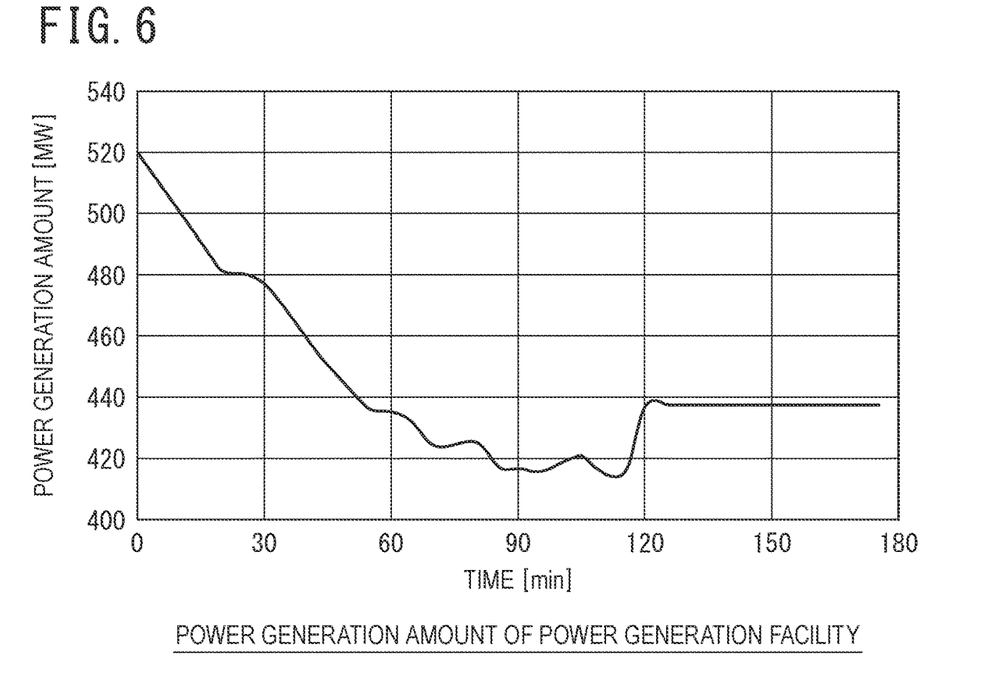
FIG. 6 is a graph illustrating changes with time of the power generation amount in a power generation facility when trouble has occurred in the coke oven of the steel works.
Figure 7:
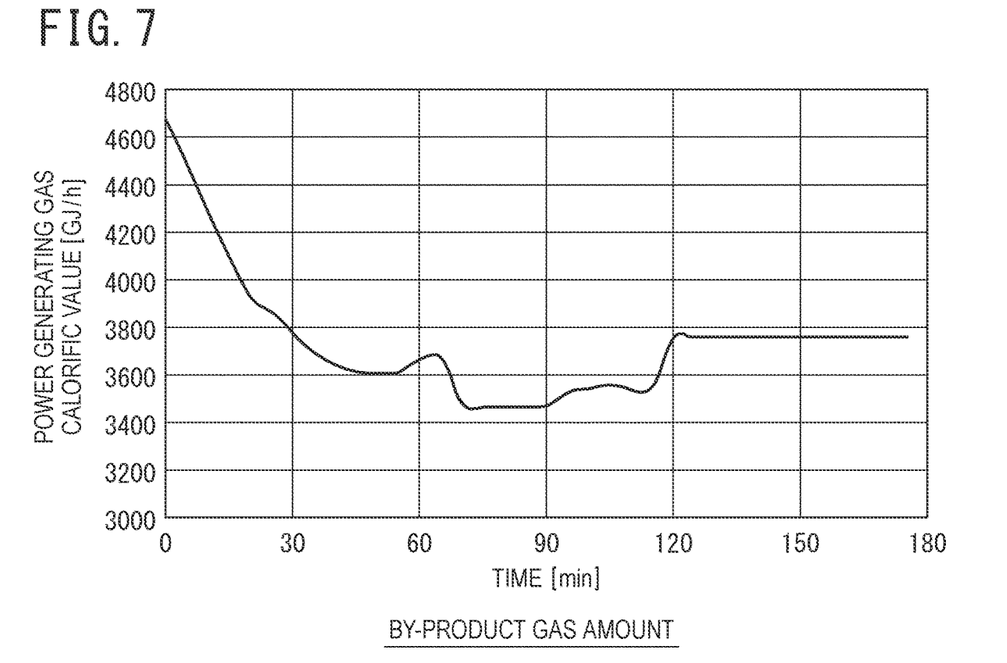
FIG. 7 is a graph illustrating changes with time of the amount of a by-product gas when trouble has occurred in the coke oven of the steel works.
Figure 8:
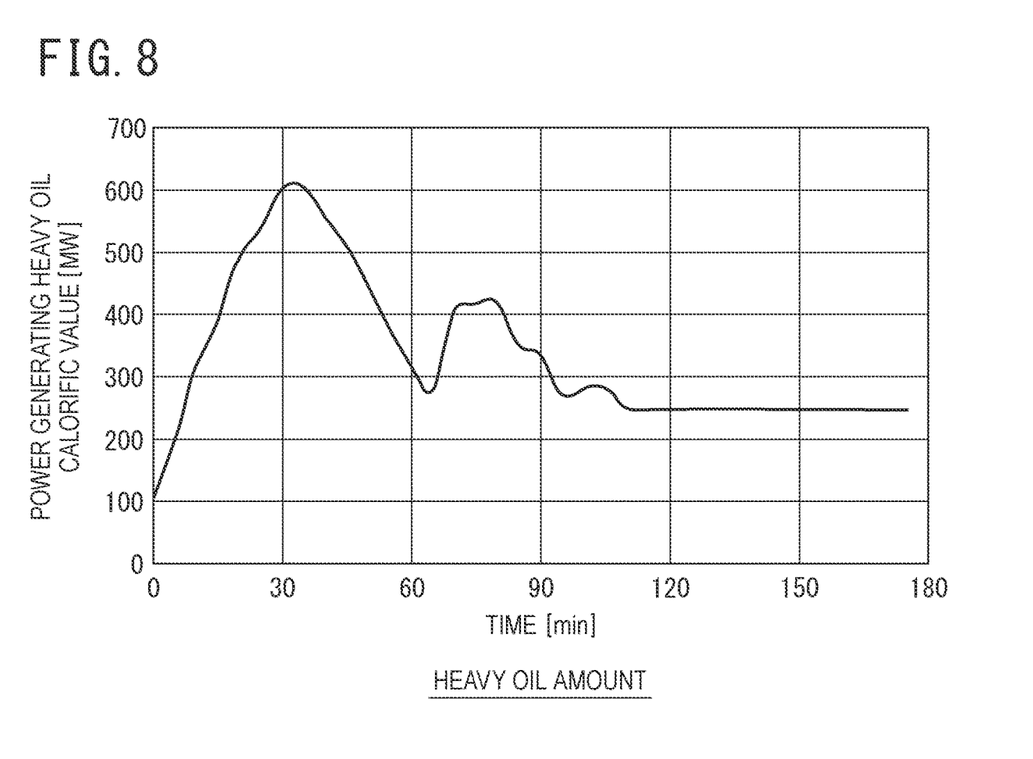
FIG. 8 is a graph illustrating changes with time of the amount of heavy oil, which is externally purchased fuel, when trouble has occurred in the coke oven in the steel works.

FIG. 6 illustrates changes with time of the power generation amount of the power generation facility when trouble has occurred in the coke oven. FIG. 7 illustrates the amount of a by-product gas which is the used fuel when trouble has occurred in the coke oven. FIG. 8 illustrates the amount of heavy oil which is externally purchased fuel when trouble has occurred in the coke oven. As is apparent from FIGS. 6 to 8, even when the generation amount of the C gas decreases, a sudden change in the power generation amount is undesirable, and therefore the output of the power generation amount is gradually reduced and the purchase amount of the heavy oil is increased. Herein, as illustrated in FIG. 4, the period average of the shortage amount of the C gas for 30 minutes to 50 minutes after the start of the operation is approximately 500 [GJ/h].

Next, the operation of the energy operation support device 1 when trouble has occurred in the coke oven in the circumstance described above is described.

The optimization calculation unit 4 of the energy operation support device 1 reads all of the generation amount result values SJ and the consumption amount result values DJ at the current time of the energy utilities and the generation amount prediction values SY and the consumption amount prediction values DY of the energy utilities from the current time to a designated time of the A factory, the B factory, the C factory, . . . (Step ST1 in FIG. 3). Next, the purchase unit prices of the power, the steam, the pure water for boiler supply, and the like are read (Step ST2 in FIG. 3), and the functioning information of the energy facilities (power generation facility, TRT, CDQ, gas holder, mixed gas manufacturing facility) is read (Step ST3 in FIG. 3). Then, the generation variables Si (i=1, 2, . . . N) are set (Step ST4 in FIG. 3), the consumption variables Di (i=1, 2, . . . M) are set (Step ST5 in FIG. 3), and the constraint condition of Expression (1) above is established using the shortage amount determination variable X (Step ST6 in FIG. 3).

Then, the objective function (Total cost F+Value obtained by multiplying the shortage amount determination variable X by the weighting constant C) is minimized or set to a value close to the minimum under the constraint condition of Expression (1). Then, the obtained operation conditions of the energy facilities (power generation facility, TRT, CDQ, gas holder, mixed gas manufacturing facility) are set (Step ST9 in FIG. 3).

Figure 9:
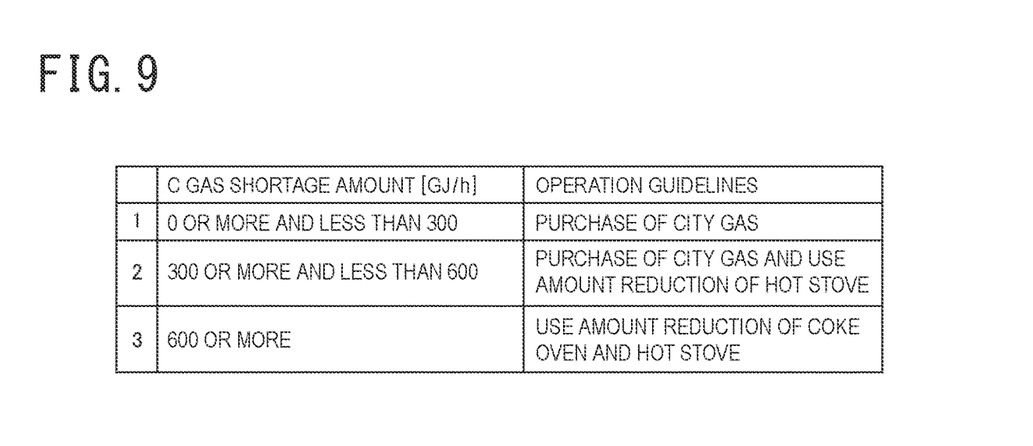
FIG. 9 illustrates operation guideline data stored in an operation guideline creation unit of the energy operation support device according to the present invention.

Further, the operation guideline creation unit 5 of the energy operation support device 1 associates the shortage amount X (500 [GJ/h]) arithmetically operated in the optimization calculation unit 4 with the plurality of operation guideline data illustrated in FIG. 9, and selects the operation guideline of purchasing a city gas and reducing the use amount of a hot-blast stove in "2".

Then, the guidance unit 6 of the energy operation support device 1 displays "Purchase of city gas and Use amount reduction of hot-blast stove" on the guidance screen.

This enables an operator of each factory to quickly change the operation conditions of the energy facilities by referring to the operation guideline "Purchase of city gas and Use amount reduction of hot-blast stove" output onto the guidance screen.

The circumstance in which a shortage of the C gas occurs in the running of the steel works is described, but, even in circumstances of the shortage of other energy utilities, such as the by-product gases, steam, and power, occur, the energy operation support device 1 similarly supports the operation.

Therefore, the energy operation support device 1 of this embodiment calculates the shortage amount by the optimization calculation based on the constraint condition using the generation variables Si, the consumption variables Di, and the shortage amount determination variable X, and sets the operation conditions of the energy facilities (power generation facility, TRT, CDQ, gas holder, mixed gas manufacturing facility). Therefore, in the situation of the shortage of the energy utilities (at least one of by-product gases, steam, and power) in the steel works, a minimum necessary change plan of the energy facilities can be presented to the operator of each factory.

Further, the operation conditions of the energy facilities are changed based on the presented change plane of the operation conditions or running conditions of the manufacturing facility within the steel works are changed, thereby enabling the running of the steel works of realizing the optimum operation of the energy facilities.

| Reference Signs List | |
|---|---|
| 1 | energy operation support device |
| 4 | optimization calculation unit |
| 5 | operation guideline creation unit |
| 6 | guidance unit |
| C | weighting constant |
| F | total cost to be optimized |
| X | shortage amount determination variable |
| DB1 | energy utility result/prediction database |
| DB2 | unit price information database |
| DB3 | functioning information database |
| Si (i = 1, 2, . . . N) | generation variables |
| Di (i = 1, 2, . . . M) | consumption variables |

The invention claimed is:

1. A method for running a steel works comprising:
acquiring (i) result values of a generation amount and a consumption amount of an energy utility at a current time and (ii) prediction values of the generation amount and the consumption amount of the energy utility from the current time to a designated time for each factory configuring the steel works;
acquiring unit price information required for calculating a total cost for an energy operation of the steel works;
acquiring functioning information of an energy facility of the steel works;
based on information acquired, setting, by a computer, an operation condition of the energy facility as a determination variable, constituting a balance condition of the energy utility, adding a shortage amount determination variable of the energy utility to a generation variable side of the balance condition and establishing a constraint condition, setting an objective function containing the total cost for the energy operation of the steel works and the shortage amount determination variable, and arithmetically operating the determination variable such that the objective function asymptotically approaches an optimum value to satisfy the constraint condition;
transmitting an operation guideline to an operator based on the shortage amount arithmetically operated; and
based on the transmitted operation guideline, changing the operation condition of the energy facility by operating equipment in the energy facility to change a use amount of the energy facility within the steel works, wherein
the objective function is established by adding a first value to the total cost, the first value being obtained by multiplying the shortage amount determination variable by a weighting constant, the weighting constant being set such that the first value is larger than the total cost.

2. The method according to claim 1, wherein the transmitted operation guideline is selected from a plurality of operation guidelines according to the shortage amount.

* * * * *